United States Patent [19]

Kollar et al.

[11] Patent Number: 5,264,083
[45] Date of Patent: Nov. 23, 1993

[54] DISTILLATION COLUMN TRAY

[75] Inventors: Richard Kollar, Douai; Robert Maurage, Saint-Ghislain, both of France

[73] Assignees: Metaleurop S.A., France; Hepworth Refractories (Belgium) S.A., Belgium

[21] Appl. No.: 696,516

[22] Filed: May 7, 1991

[30] Foreign Application Priority Data

May 7, 1990 [FR] France .................. 90 05716

[51] Int. Cl.⁵ .......................... B01D 3/32; B01F 3/04
[52] U.S. Cl. ........................ 202/158; 202/267.1; 202/267.2; 261/114.1; 261/114.5
[58] Field of Search ............... 202/158, 267.1, 267.2; 203/86; 159/15, 18; 261/114.1, 114.5; 148/705

[56] References Cited

U.S. PATENT DOCUMENTS

| | | | |
|---|---|---|---|
| 2,982,527 | 5/1961 | Eld et al. | 202/158 |
| 2,983,494 | 5/1961 | Handwerk | 202/158 |
| 2,998,234 | 8/1961 | Haselden | 202/158 |
| 3,018,094 | 1/1962 | Mikkelson | 202/158 |
| 3,039,751 | 6/1962 | Versluis | 202/158 |
| 3,792,843 | 2/1974 | Stage | 202/158 |
| 3,840,070 | 10/1974 | Becker et al. | 202/187 |
| 4,256,674 | 3/1981 | Shafrarousky et al. | 202/158 |
| 4,305,895 | 12/1981 | Heath et al. | 261/114.1 |
| 4,310,475 | 1/1982 | Leva | 202/158 |
| 4,501,707 | 2/1985 | Bühlmann | 202/158 |
| 4,604,247 | 8/1986 | Chen et al. | 202/158 |
| 4,676,934 | 6/1987 | Seah | 202/158 |
| 5,047,179 | 9/1991 | Nye | 261/114.1 |

FOREIGN PATENT DOCUMENTS

| | | | |
|---|---|---|---|
| 2300717 | 7/1973 | Fed. Rep. of Germany | 202/158 |
| 2649774 | 5/1978 | Fed. Rep. of Germany | 202/158 |
| 1528358 | 7/1968 | France . | |
| 3141605 | 6/1988 | Japan | 202/158 |
| 1289521 | 2/1987 | U.S.S.R. | 202/158 |
| 1444418 | 7/1976 | United Kingdom . | |

*Primary Examiner*—Virginia Manoharan
*Attorney, Agent, or Firm*—Blakely, Sokoloff, Taylor & Zafman

[57] ABSTRACT

A distillation tray including a use with a distillation column tray and a heating chamber with each tray including a bottom pierced by a through hole and a rim surrounding the bottom and having at least one outside flank. The outside flank includes a plurality of relative projections regularly spaced apart along the rim and constituting undulations. The tray is applicable to metallurgy, and in particular to distilling metals such as zinc.

7 Claims, 1 Drawing Sheet

DISTILLATION COLUMN TRAY

The present invention relates to a tray for a "tray" type distillation column, the tray comprising a bottom pierced by a through hole, and a rim surrounding the bottom and having at least one outside flank. The invention also relates to a "tray" type distillation column including such trays, and to the use of such a column.

The invention is particularly advantageously applied to metallurgy for distilling metals, and in particular zinc.

BACKGROUND OF THE INVENTION

At present, distillation column trays as described above and as used in metallurgy for distilling metals are generally rectangular in shape, with the rim surrounding the bottom of a tray then having four plane outside flanks. In addition, the through holes are usually provided in laterally offset portions of the tray bottoms. Thus, the trays are stacked one above another in a distillation column in such a manner as to place said through holes in a zigzag configuration so that the non-pierced portions of the bottoms act as baffles which increase heat exchange between the vapor flowing upwards and the liquid flowing downwards. This type of distillation column is also known as a "New Jersey retort".

When metals having a high boiling temperature are to be distilled, e.g. 907° C. for zinc, the heating chamber for vaporizing the metal, or more precisely the mixture in which the metal to be distilled is engaged, must provide an enormous quantity of heat which tends to increase the cost price of the metal distilled in this way. Attempts have therefore been made to increase the production to energy cost ratio of such distillation columns.

Initially, the trend was to improve the production capacity of distillation units for given energy consumption. To this end, use has been made of columns of larger-sized trays associated with heating chambers attached thereto. However this solution suffers from the drawback of reducing the volume of the heating chambers. In addition, following the sudden increase in the price of oil products, the major concern in the industry has been to reduce the quantity of fuel consumed, while simultaneously making efforts to improve energy efficiencies.

Thus, the technical problem to be solved by the present invention is to provide a distillation column tray of the type specified above that enables the same quantity of distilled metal to be produced for a considerable reduction in energy consumption.

SUMMARY OF THE INVENTION

According to the present invention, the solution to the technical problem posed consists in the said outside flank including at least one relative projection.

Compared with the plane outside flanks of trays in the state of the art, the presence of at least one relative projection in a tray of the invention has the effect of changing, and in particular of improving, the coupling between the tray and the heat flow produced by the heating chamber. The relative projection increases the heat transfer area, thereby increasing heat exchange by conduction. In addition, because of the disturbances caused by said relative projection, heat transfer by convection is increased since the boundary layer that slows down such transfer is smaller. The slight reduction in coupling by radiation due to the reduction in the radiant area between the tray and the inside wall of the column is largely compensated by the increase in conduction and convection.

In a particular embodiment of the invention in which said outside flank has a plurality of relative projections regularly spaced apart along said rim, said relative projections are provided in the form of undulations.

BRIEF DESCRIPTION OF THE DRAWINGS

An embodiment of the invention is described by way of example with reference to the accompanying drawing, in which.

DETAILED DESCRIPTION

Figure 1B:
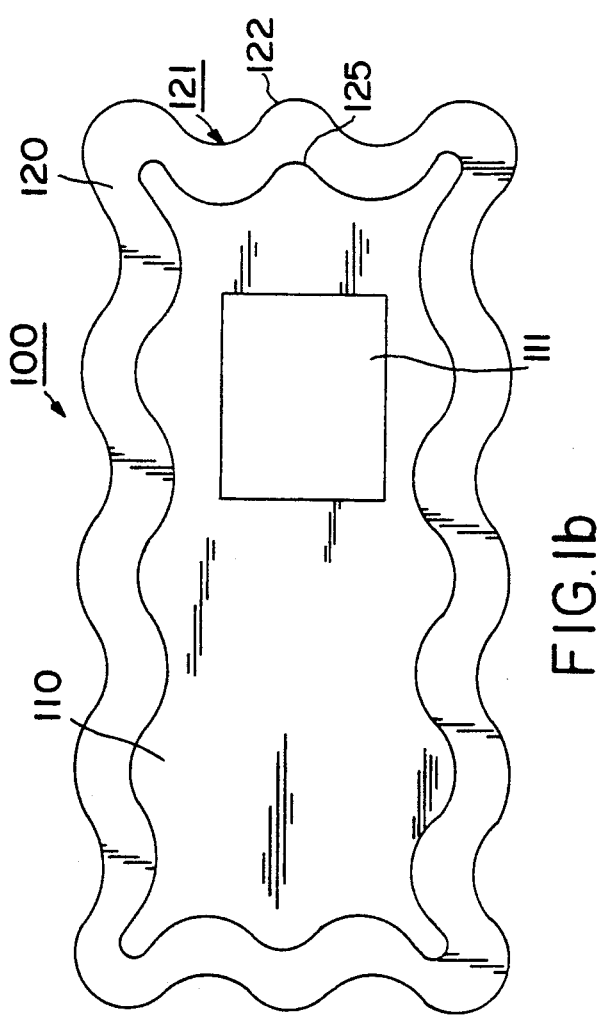
FIG. 1b is a view of the FIG. 1 tray seen from above.
Figure 1A:
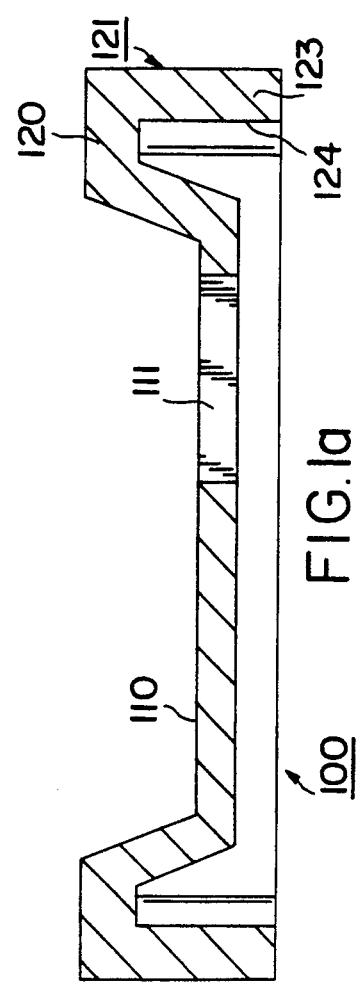
FIG. 1a is a section through a distillation column tray of the invention.

FIGS. 1a and 1b are respectively a section and a plan view of a tray 100 for a "tray" type distillation column, e.g. a column for distilling a metal such as zinc. The tray 100 includes a bottom 110 pierced by a through hole 111 enabling metal vapor having a reduced impurity content to flow up through the column and liquid having an increased impurity content to flow down towards the bottom trays before being vaporized again. The through hole 111 is situated to one side of the bottom 110. A rim 120 surrounds the bottom 110 and has an outside flank 121. As can be seen in FIGS. 1a and 1b, the outside flank 121 includes a plurality of relative projections 122 regularly distributed around the rim 120. In the example of FIG. 1b, the relative projections 122 are shown, in non-limiting manner, as being constituted by undulations. More precisely, said undulations are constituted by successive concave and convex circular arcs.

It can also be seen in FIG. 1a that said rim is substantially in the form of an upside down U-shape, with an outside branch 123 of the U relative to the tray providing both the outside flank 121 and an inside flank 124 including relative indentations 125 level with said relative projections.

In a metallurgical application where the temperatures reached may be very high, the tray 100 must be made of a refractory material. However, it is advantageous for this material to present a degree of thermal conductivity so as to provide thermal contact by conduction between the chamber for heating the distillation column and the metal mixture being distilled. Carborundum, i.e. silicon carbide SiC, is a material that is well suited to this type of application.

Figure 2:
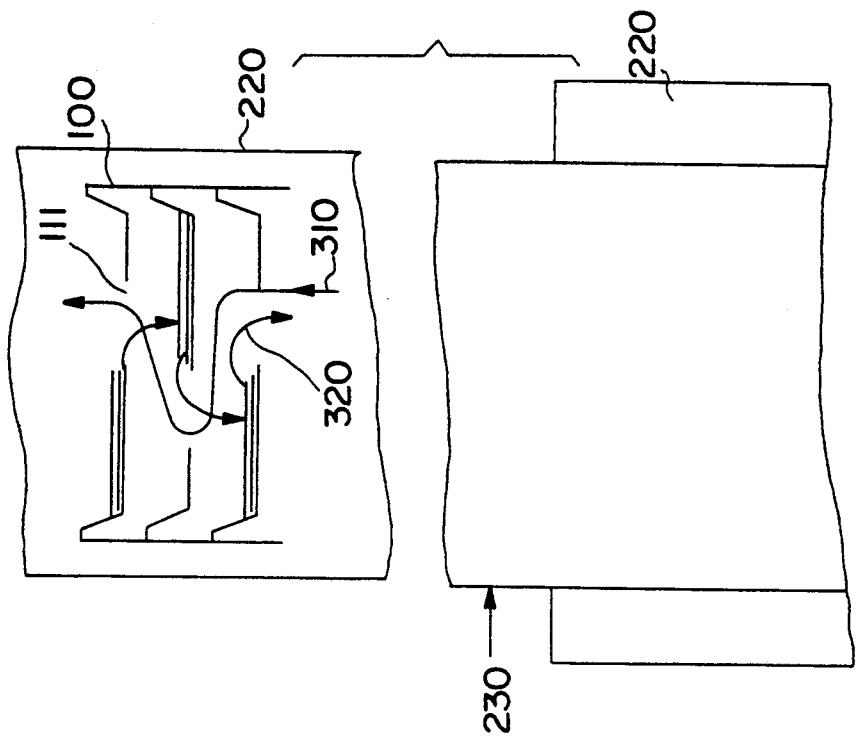
FIG. 2 is a diagrammatic section view through a distillation column of the invention.

FIG. 2 is a fragmentary section through a "tray" type distillation column for distilling zinc and including a plurality of tray 100 stacked on top of one another so that their through holes 111 are disposed in a zigzag configuration. Because of the offset positions of the through holes 111, the paths followed by the vapor 310 and the liquid 320 are lengthened, thereby improving thermal contact between the fluids inside the column. The quantity of heat required to operate the distillation column is provided by a heating chamber 220 whose coupling with the trays 100 of the column is considerably improved by the undulations in the rim of the trays. The Applicants have evaluated the energy saving that results from the invention can be as much as 15%.

Zinc together with impurities, and in particular cadmium, is injected into the column at an orifice 230. The rising vapor looses both mass and impurities, while the content of cadmium and other impurities in the falling liquid increases. Purified zinc is taken from the top of the column while a cadmium-rich alloy is formed at the bottom.

What is claimed is:

1. A distillation column including at least one column tray and a heating chamber, said at least one column tray comprising a bottom pierced by a through hole, and a rim surrounding said bottom and having at least one outside flank, wherein said at least one outside flank includes at least one relative projection for improving thermal coupling between said at least one column tray and the heating chamber, wherein said rim is substantially in the form of an upside-down U-shape, with the branch of the U-shape on the outside relative to the at least one column tray having both said at least one outside flank and an inside flank including at least one relative indentation level with said at least one relative projection.

2. The distillation column according to claim 1, wherein said at least one outside flank has a plurality of relative projections regularly spaced apart along said rim.

3. The distillation column according to claim 2, wherein said plurality of relative projections constitute undulations.

4. The distillation column according to claim 3, wherein said undulations are made up of successive concave and convex circular arcs.

5. The distillation column according to claim 1, wherein the at least one tray is made of a refractory material having good thermal conductivity.

6. The distillation column according to claim 5, wherein said material is Carborundum.

7. The distillation column according to claim 1, wherein said at least one column tray comprises a plurality of trays with the through holes thereof being situated in laterally offset portions of their bottoms, and with said plurality of trays being stacked on one another in such a manner as to dispose said through holes in a zigzag configuration.

* * * * *